(12) United States Patent
Takakuwa et al.

(10) Patent No.: US 7,575,644 B2
(45) Date of Patent: Aug. 18, 2009

(54) SOLUTION FOR TREATING METAL SURFACE, SURFACE TREATING METHOD, AND SURFACE TREATED MATERIAL

(75) Inventors: Hideki Takakuwa, Kanagawa (JP); Yuko Takanashi, Kanagawa (JP); Katsutoshi Ando, Saitama (JP); Yasuhito Murai, Saitama (JP)

(73) Assignees: Nihon Parkerizing Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 11/810,949

(22) Filed: Jun. 7, 2007

(65) Prior Publication Data

US 2008/0008902 A1 Jan. 10, 2008

(30) Foreign Application Priority Data

Jun. 7, 2006 (JP) .............................. 2006-158306

(51) Int. Cl.
*C23F 11/00* (2006.01)
*B05D 1/00* (2006.01)
*B32B 15/18* (2006.01)

(52) U.S. Cl. .................. 148/247; 148/540; 148/548; 428/469; 428/639; 428/624; 428/626; 106/14.44; 427/445; 427/372.2

(58) Field of Classification Search .................. None
See application file for complete search history.

(56) References Cited

U.S. PATENT DOCUMENTS 6,312,812 B1 * 11/2001 Hauser et al. ............... 428/412
7,250,193 B2 * 7/2007 Matsukawa et al. ........ 427/388.1
7,510,612 B2 * 3/2009 Matsukawa et al. ......... 148/247
2008/0230394 A1 * 9/2008 Inbe et al. ................... 205/241
2008/0230395 A1 * 9/2008 Inbe et al. ................... 205/261

FOREIGN PATENT DOCUMENTS

| JP | 02-025579 | | 1/1990 |
| JP | 05-195244 | | 8/1993 |
| JP | 2000-199077 | | 7/2000 |
| JP | 2000-204485 | | 7/2000 |
| JP | 2004-043913 | | 2/2004 |
| JP | 2004218070 A | * | 8/2004 |
| JP | 2004218073 A | * | 8/2004 |
| JP | 2004218074 A | * | 8/2004 |

* cited by examiner

*Primary Examiner*—John J. Zimmerman
*Assistant Examiner*—Aaron Austin
(74) *Attorney, Agent, or Firm*—Flynn, Thiel, Boutell & Tanis, P.C.

(57) ABSTRACT

A solution for treating a surface of an iron material includes (a) zirconium fluoride; (b) ion of a rare earth element and/or a compound containing a rare earth element; (c) a polyallylamine; (d) aluminum ion; and (e) free fluorine ion. Zirconium in the component (a) is at a weight concentration A of 10 to 1000 ppm. The ratio K of the weight concentration B of the rare earth element in the component (b) to the weight concentration A (B/A) is 0.1 to 30. The component (d) is at a weight concentration D of 50 to 250 ppm. The component (e) is at a weight concentration E of 0.5 to 30 ppm. A coating having excellent corrosion resistance before and after the subsequent coating can be deposited on the surface of an iron material by using the surface treating solution which does not contain environmentally harmful ingredients.

4 Claims, No Drawings

SOLUTION FOR TREATING METAL SURFACE, SURFACE TREATING METHOD, AND SURFACE TREATED MATERIAL

The entire contents of documents cited in this specification are incorporated herein by reference.

BACKGROUND OF THE INVENTION

This invention relates to a solution for treating a surface of an iron material to form a coating thereon, a method for treating a surface of an iron material using such solution, and an iron material having a coating formed by using such method.

The surface treatments most commonly used for depositing a coating having excellent corrosion resistance after coating on a metal surface are zinc phosphate treatment and chromate treatment. Among these, the zinc phosphate treatment is capable of depositing a coating having excellent corrosion resistance on a steel strip such as a hot rolled steel strip or a cold rolled steel strip or a galvanized steel strip.

However, this zinc phosphate treatment inevitably involves generation of sludge as a by-product of the reaction.

In view of such situation, technologies have been recently developed in which the corrosion resistance is imparted to a metal surface by covering the metal surface with a thin coating containing a metal such as zirconium, the solution used in the surface treatment is free from harmful components, and the sludge generation is avoided. Exemplary such surface treatment methods are as described below.

For example, JP 2000-204485 A discloses a compound containing nitrogen atom having a lone pair, and a chromium-free coating composition for a metal surface containing such compound and a zirconium compound. An object of this chromium-free coating composition for a metal surface is to provide a coating having improved corrosion resistance and adhesion after further coating by using a solution free from the harmful hexavalent chromium.

However, the metal materials which can be treated by this chromium-free coating composition for a metal surface are limited to aluminum alloys, and it has been difficult to treat an article having a surface with complicated shape because a coating is formed by applying the coating composition on the article and subsequently drying the article.

JP 2-25579 A discloses a surface treatment for depositing a coating having excellent adhesion and corrosion resistance after further coating by chemical conversion. This treatment uses a surface treating composition and a surface treating bath containing cerium, zirconium, phosphoric acid, and fluorine compound.

However, this surface treatment is also limited in the material which can be treated, and as in the case of the chromium-free coating composition for a metal surface described in JP 2000-204485 A, only aluminum or aluminum alloys which are inherently corrosion resistant can be treated by this method, and this surface treatment cannot deposit a coating on the surface of an iron material (an iron-base metal material).

JP 2000-199077 A discloses a surface treatment in which a coating having excellent corrosion resistance and adhesion after further coating is deposited by using a surface treating composition containing a metal acetylacetonate and a water soluble inorganic titanium compound or a water soluble inorganic zirconium compound. This method expanded the range of metal materials that could be surface treated from only the aluminum alloys to the range also including magnesium, magnesium alloys, zinc, and galvanizing alloys.

However, a coating cannot be deposited by this surface treatment on the surface of an iron material such as a hot rolled steel strip or a cold rolled steel strip.

JP 5-195244 A discloses a surface treatment of a metal surface by a chromium-free acidic composition. In this treatment of the metal surface, an aqueous solution containing the components which can form a corrosion-resistant coating is applied on the metal surface, and without rinsing with water, the coating is fixed by baking and drying. Accordingly, the coating formation does not involve a chemical reaction, and the method can also be used in depositing a coating on a metal surface as in a hot rolled steel strip, a cold rolled steel strip, a galvanized steel strip, and an aluminum alloy plate.

However, as in the case of the chromium-free coating composition for a metal surface described in JP 2000-204485 A, the coating is formed by application and drying, and formation of a uniform coating on an article having a complicated surface shape has been difficult.

JP 2004-43913 A discloses a metal chemical conversion method using a bath containing zirconium ion and/or titanium ion and fluorine ion. This method can be used for treating metal materials including iron base material, aluminum, and zinc.

However, this method has various limitations in the treatment process including the need of controlling the iron ion concentration in the chemical conversion agent with an oxidizing agent during the treatment.

As described above, no surface treating method has been conventionally known which uses a surface treating solution free from environmentally harmful ingredients and is capable of providing a coating having an excellent corrosion resistance simultaneously with an excellent adhesion on an iron material at an acceptable production efficiency.

SUMMARY OF THE INVENTION

In view of the situation as described above, an object of the present invention is to provide a solution for treating the surface of an iron material and a method for treating the surface of an iron material which are capable of depositing a coating having excellent corrosion resistance both before and after the subsequent coating on the surface of an iron material such as hot rolled or cold rolled steel strip used for automobiles by using a surface treating solution which does not contain environmentally harmful ingredients, which could not be accomplished by prior art techniques.

Another object of the present invention is to provide a coated iron material produced by using such solution or method.

The present invention provides the following (1) to (4).

(1) A solution for treating a surface of an iron material comprising components (a), (b), (c), (d), and (e):
  (a) zirconium fluoride:
  (b) ion of a rare earth element and/or a compound containing a rare earth element;
  (c) a polyallylamine;
  (d) aluminum ion; and
  (e) free fluorine ion, wherein
  zirconium in the component (a) is included at a weight concentration A of 10 to 1000 ppm,
  a ratio K of a weight concentration B of the rare earth element in the component (b) to the weight concentration A (K=B/A) is 0.1 to 30,
  the component (d) is included at a weight concentration D of 50 to 250 ppm, and
  the component (e) is included at a weight concentration E of 0.5 to 30 ppm.

(2) The solution for treating the surface of the iron material according to (1) above wherein the solution has a pH of 2.0 to 5.0.

(3) A method for treating a surface of an iron material comprising the step of:

contacting the iron material with the solution for treating the surface of the iron material of (1) or (2) above.

(4) A coated iron material comprising:

an iron material; and a coating formed on a surface of the iron material by the method for treating the surface of the iron material of (3) above, the coating containing zirconium and having a zirconium coating weight of at least 20 mg/m$^2$.

The method of the present invention for treating a surface of an iron material using the surface treating solution for an iron material of the present invention is capable of forming a coating having excellent corrosion resistance both before and after the subsequent coating on the surface of an iron material.

The surface treating solution used in a bath which does not contain environmentally harmful ingredients. It has been difficult for such deposition to be accomplished by the prior art techniques.

DETAILED DESCRIPTION OF THE INVENTION

Next, the surface treating solution for an iron material of the present invention (hereinafter also simply referred to as the "surface treating solution of the present invention"), the method for treating a surface of an iron material of the present invention (hereinafter also simply referred to as the "surface treating method of the present invention"), and the coated iron material of the present invention (hereinafter also simply referred to as the "iron material of the present invention") are described in detail. First, the surface treating solution of the present invention is described.

The material treated by the surface treating solution of the present invention is an iron material.

The iron material is not limited to any particular material as long as the material includes iron, and exemplary materials include steel strips such as cold rolled steel strip and hot rolled steel strip: cast-iron plate; and sintered material.

The present invention is capable of conducting the surface treatment on two or more metal materials at once. In such case, at least one metal material of the two or more metal materials is iron material, and the other metal materials may be selected from among zinc, aluminum, magnesium, nickel, and alloys of such metals. The two or more metal materials may be separate metal materials not contacting with each other or two or more metal materials joined together or contacting with each other by such means as welding, adhesion, or riveting.

The surface treating solution of the present invention contains the component (a), the component (b), the component (c), the component (d), and the component (e) as described below.

The component (a) is zirconium fluoride. Zirconium fluoride is a fluorocomplex of zirconium, and the surface treating solution of the present invention may contain the zirconium fluoride either in the form of an ion such as $ZrF_6^{2-}$ or in a nonionized form.

The component (a) may be incorporated in the surface treating solution of the present invention by using a compound containing zirconium fluoride. Alternatively, zirconium fluoride may be formed by reacting a zirconium compound with another compound in the solution.

Exemplary compounds containing zirconium fluoride include $H_2ZrF_6$ (hexafluorozirconic acid), and salts of the $H_2ZrF_6$. Exemplary $H_2ZrF_6$ salts include $K_2ZrF_6$, $Na_2ZrF_6$, and $(NH_4)_2ZrF_6$, which may be used either alone or in combination of two or more.

Exemplary zirconium compounds not containing the zirconium fluoride include $ZrCl_4$, $ZrOCl_2$, $Zr(OH)_2Cl_2$, $Zr(OH)_3$ Cl, Zr $(SO_4)_2$, $ZrOSO_4$, $Zr(NO_3)_4$, $ZrO(NO_3)_2$, $Zr(OH)_4$, $H_2(Zr(CO_3)_2(OH)_2)$ and a salt of the $H2(Zr(CO_3)_2(OH)_2)$, $H_2Zr(OH)_2(SO_4)_2$ and a salt of the $H_2Zr(OH)_2(SO_4)_2$, $ZrO_2$, $ZrOBr_2$, and $ZrF_4$, which may be used either alone or in combination of two or more.

Examples of the compound reacted with the zirconium compounds include fluorine-containing compounds such as HF (hydrofluoric acid), $H_2TiF_6$ and a salt of the $H2TiF_6$, $TiF_4$, $H_2HfF_6$ and a salt of the $H_2HfF_6$, $HfF_4$, $H_2SiF_6$, $HBF_4$ and a salt of the $HBF_4$, $NaHF_2$, $KHF_2$, $NH_4HF_2$, NaF, KF, and $NH_4F$, which may be used either alone or in combination of two or more.

Zirconium in the component (a) is a substance having excellent resistance to both acid and alkali, and this component constitutes the main ingredient of the coating formed by the surface treatment.

The component (b) includes ion of a rare earth element and/or a compound containing a rare earth element. The rare earth elements are scandium (Sc), yttrium (Y), and lanthanoids (La, Ce, Pr, Nd, Pm, Sm, Eu, Gd, Tb, Dy, Ho, Er, Tm, Yb, and Lu).

The rare earth element ions may be used alone or in combination of two or more.

The compounds containing a rare earth element include chloride, sulfate, nitrate, and oxide of a rare earth element.

Examples include scandium chloride, yttrium chloride, lanthanum chloride, cerium chloride, praseodymium chloride, neodymium chloride, promethium chloride, samarium chloride, europium chloride, gadolinium chloride, terbium chloride, dysprosium chloride, holmium chloride, terbium chloride, thulium chloride, ytterbium chloride, lutetium chloride, scandium sulfate, yttrium sulfate, lanthanum sulfate, cerium sulfate, praseodymium sulfate, neodymium sulfate, promethium sulfate, samarium sulfate, europium sulfate, gadolinium sulfate, terbium sulfate, dysprosium sulfate, holmium sulfate, erbium sulfate, thulium sulfate, ytterbium sulfate, lutetium sulfate, scandium nitrate, yttrium nitrate, lanthanum nitrate, cerium nitrate, praseodymium nitrate, neodymium nitrate, promethium nitrate, samarium nitrate, europium nitrate, gadolinium nitrate, terbium nitrate, dysprosium nitrate, holmium nitrate, erbium nitrate, thulium nitrate, ytterbium nitrate, lutetium nitrate, scandium oxide, yttrium oxide, lanthanum oxide, cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, and lutetium oxide.

The rare earth element-containing compounds may be used either alone or in combination of two or more.

The component (b) has the effect of promoting the deposition of the component (a) to form the coating. This component (b) may also be present in the coating, and such inclusion is expected to improve the corrosion resistance both before and after the subsequent coating.

The component (c) is a polyallylamine.

The polyallylamine may be either the one having the, amino group in free form, or a salt type polyallylamine (for example, a hydrochloride).

The polyallylamine may preferably have a weight average molecular weight of 500 to 10000, more preferably 1000 to 6000, and most preferably 2000 to 4000.

The polyallylamine used may be a commercially available polyallylamine. Exemplary polyallylamines include PAA series manufactured by Nitto Boseki Co., Ltd. Among the currently available PAA series polyallylamines, the preferred is PAA-03 having a weight average molecular weight of 3000.

These polyallylamines may be used alone or in combination of two or more.

The action of the polyallylamine is presumably suppression of the reaction of coating formation by the deposition of the polyallylamine which simultaneously improves quality of the coating in the course of the coating deposition. The deposited polyallylamine also contributes to the improvement of the corrosion resistance.

The component (d) is aluminum ion.

The component (d) may be incorporated in the surface treating solution of the present invention by using an aluminum compound such as oxide, hydroxide, fluoride, chloride, sulfate, nitrate, borate, or an organic acid salt. Exemplary such aluminum compounds include $Al_2O_3$, $Al(OH)_3$, $AlF_3$, $AlCl_3$, $Al_2(SO_4)_3$, $Al(NO_3)_3$, and $2Al_2O_3.B_2O_3.3H_2O$, which may be used alone or in combination of two or more.

The component (d) contributes to the improvement of the corrosion resistance by deposition of the aluminum in the course of formation of the coating by the surface treatment. The component (d) also has the effect of promoting the formation of the coating by forming a fluorine complex compound with the free fluorine ion of the component (e). Accordingly, incorporation of the component (d) not only contributes to the excellent corrosion resistance but also enables control of the free fluorine ion concentration.

The component (e) is free fluorine ion. Free fluorine ion is fluoride ion ($F^-$) in free state.

The component (e) may be incorporated in the surface treating solution of the present invention by using a fluorine compound. Exemplary fluorine compounds include HF, $H_2HfF_6$, $HfF_6$, $H_2TiF_6$, $TiF_4$, $H_2ZrF_6$, $ZrF_4$, $HBF_4$ and a salt of the $HBF_4$, $NaHF_2$, $KHF_2$, $NH_4HF_2$, NaF, KF, and $NH_4F$, which may be used alone or in combination of two or more.

In the surface treating solution of the present invention, the components as described above are dissolved or dispersed in water.

In the surface treating solution of the present invention, the coating of sufficient amount will be deposited in practically acceptable time without detracting from economic advantage when the zirconium in the component (a) is included at a weight concentration A of 10 to 1000 ppm.

In the surface treating solution of the present invention, the ratio K of the weight concentration B of the rare earth element in the component (b) to the weight concentration A (i.e. K=B/A) is 0.1 to 30. When K is within such range, promotion by the component (b) of the deposition of the coating of the component (a) will be sufficient and the coating weight, and hence, corrosion resistance will be sufficient. When K is within such range, the number of starting points for the reaction of the component (a) on the surface of the iron material will be sufficient, and the coating weight of the component (a) will be sufficient, and consequently, the corrosion resistance and the adhesion will be excellent.

In the surface treating solution of the present invention, the component (c) is preferably at a weight concentration C of 5 to 200 ppm, and more preferably at 20 to 70 ppm. When the component (c) is within such range, the amount of the component (c) deposited will be adequate, and the coating will exhibit excellent corrosion resistance and adhesion.

In the surface treating solution of the present invention, the component (d) is preferably at a weight concentration D of 50 to 250 ppm. When the component (d) is within such range, the amount of aluminum deposited in the course of the formation of the coating layer will be adequate, and the coating will exhibit excellent corrosion resistance in both the warm salt water test and the combined cycle test. On the other hand, when the weight concentration D is less than 50 ppm, the amount of aluminum deposited during the formation of the coating layer will be below the adequate amount, and the corrosion resistance in the combined cycle test may be insufficient. When the weight concentration D is in excess of 250 ppm, the amount of aluminum deposited during the formation of the coating layer will be unduly increased, and the corrosion resistance in the warm salt water test may be insufficient.

In the surface treating solution of the present invention, the weight concentration E of the component (e) is 0.5 to 30 ppm. When the component (e) is within such range, the surface treating solution of the present invention will be highly stable, and troubles are less likely to occur in the continuous operation. When the component (e) is within such range, the risk of excessive etching of the iron material surface is also reduced and it will be less likely that the deposition of the sufficient amount of coating for realizing the corrosion resistance is difficult.

The weight concentration E of the component (e) is a free fluorine ion concentration measured by a commercially available ion electrode.

The surface treating solution of the present invention may preferably have a pH of 2.0 to 5.0.

Preferably, the surface treating solution of the present invention causes deposition of the coating by a chemical reaction involving etching of an iron material. In general, deposition of the coating is likely to take place when the surface treating solution is in such pH range.

In the case where the pH of the surface treating solution of the present invention should be adjusted, the reagent used in such adjustment is not particularly limited. Exemplary pH adjusting reagents include acids such as hydrochloric acid, sulfuric acid, boric acid, and organic acid; and alkalis such as lithium hydroxide, potassium hydroxide, sodium hydroxide, calcium hydroxide, magnesium hydroxide, barium hydroxide, alkali metal salt, ammonia, ammonium salt, and amine.

The surface treating solution of the present invention may also include metal components that had been included in and was leached out from the iron material by the etching of the iron material as well as metal components and compounds that had been included in the tap water or industrial water because formation of the coating by the deposition of the component (a) is hardly affected by the presence of other metal elements or compounds thanks to the promotion of the deposition of the component (a) by the component (b).

The surface treating solution of the present invention may also contain nitric acid and/or a nitrate compound.

Exemplary nitrate compounds include metal nitrates such as iron nitrate, manganese nitrate, nickel nitrate, cobalt nitrate, silver nitrate, sodium nitrate, potassium nitrate, magnesium nitrate, and calcium nitrate, which may be used either alone or in combination of two or more.

The nitric acid and/or the nitrate compound has the action of maintaining stability of the treating solution by improving solubility of the component (a) and the component (b) in the surface treating solution of the present invention. The nitric acid and/or the nitrate compound also has the action of facilitating the deposition of the component (a) as the coating although the action is not as prominent as that of the component (b).

Next, the surface treating method of the present invention is described.

The surface treating method of the present invention is a method of treating the surface of an iron material comprising the step of bringing the iron material into contact with the surface treating solution of the present invention.

When the iron material is brought into contact with the surface treating solution of the present invention, a coating of zirconium oxide and/or zirconium hydroxide is deposited on the surface of the iron material by chemical conversion, and the formed coating layer exhibits excellent adhesion and corrosion resistance.

The zirconium hydroxide in the component (a) is chemically difficult to produce in the form of pure hydroxide, and zirconium hydroxide having hydration water is also commonly included in the category of the zirconium hydroxide. Accordingly, hydroxide of zirconium finally becomes an oxide when heated. The coating layer formed by the surface treatment of the present invention is in the state of a mixture of the oxide and the hydroxide when the coating is dried at room temperature or at a lower temperature after the surface treatment, and in the state of solely or predominantly comprising the oxide when the coating is dried at a higher temperature after the surface treatment.

The method used in bringing the iron material into contact with the surface treating solution of the present invention is not particularly limited, and exemplary methods include spraying, dipping, flowing of the solution over the iron material, which may be used alone or in combination of two or more (for example by using the dipping simultaneously with the spraying).

Also, the dipping is not particularly limited as to whether the solution is stirred or not in the treatment tank, the pressure used in spraying, the type of the nozzle used in the spraying, and the like.

In the surface treating method of the present invention, the condition applied to the use of the surface treating solution of the present invention is not particularly limited.

The treatment is preferably conducted at a temperature of 25 to 70° C., and more preferably at 35 to 50° C. Treatment at a temperature of up to 70° C. is economically preferable in view of the energy saving.

The time used for the treatment may be adequately selected.

The iron material is preferably cleaned by degreasing. The method used for the degreasing is not particularly limited, and the degreasing may be accomplished by any method known in the art.

As described above in detail, the present invention has enabled dramatic improvement of corrosion resistance of an iron material by providing either one of the coating layer comprising oxide and/or hydroxide of zirconium, and a coating layer comprising a mixture of the zirconium coating layer and the coating layer comprising oxide and/or hydroxide of the metal element of the component (b) on the surface of the iron material. The coating layer comprising the oxide and/or hydroxide of zirconium is chemically stable since it has resistance to acids and alkalis.

In the actual corrosive environments under the coating of the iron material, pH decreases in the anode portion where the iron material dissolves, and the pH increases in the cathode portion where the iron material is reduced. Accordingly, a coating will be dissolved and the effects of its deposition will be lost if the coating has inferior resistance to acids and alkalis.

The coating comprising zirconium oxide and/or hydroxide formed by the present invention is resistant to acids and alkalis, and since the coating formed on the surface of the iron material by the surface treatment in the present invention is uniform and thin, excellent anti-corrosive action is maintained under the corrosive environments.

The oxide and/or the hydroxide of the zirconium in the coating forms a network structure mediated by the zirconium and the oxygen, and therefore, the coating formed is an excellent barrier coating. While the type of the corrosion of the iron material may differ depending on the environment under which the material is used, the corrosion is most typically a corrosion requiring oxygen in the presence of water and oxygen, and such corrosion proceeds at a higher speed in the presence of particular components such as chlorides.

The coating layer formed in the present invention realizes excellent corrosion resistance since it has barrier effects against water, oxygen, and other corrosive components.

In order to improve the corrosion resistance of the iron material by using such barrier effect, the coating layer is preferably deposited by the surface treatment to a coating weight in terms of zirconium of at least 20 mg/m$^2$, more preferably at least 30 mg/m$^2$, and still more preferably at least 40 mg/m$^2$.

In other words, the present invention provides a coated iron material comprising an iron material and a coating formed on the surface of the iron material by the surface treating method of the present invention, the coating contains zirconium, and the coating has a zirconium coating weight of at least 20 mg/m$^2$.

In contrast, an excessively high coating weight may invite generation of cracks in the coating layer formed by the surface treatment, and formation of uniform coating may become difficult. Accordingly, the coating weight in terms of zirconium is preferably up to 1 g/m$^2$, and more preferably up to 800 mg/m$^2$.

EXAMPLES

Next, the present invention is described in further detail by referring to the Examples which by no means limit the scope of the present invention. More specifically, the plates, the degreasing agent, and the coating composition to be used in the Examples have been adequately selected from commercially available products, and they do not limit the actual application of the present invention.

1. Preparation of Coated Iron Material

Coated iron materials were produced by treating the test plates as described below with the surface treating solutions by the procedures as described below.

[Test Plate]

Abbreviation and specification of the test plates are as described below.

SPC (cold rolled steel strip, JIS-G-3141)

High tensile (high tensile steel strip, JIS-G-3135)

[Treatment Procedure]

Surface treatment in Examples 1 to 5 and Comparative Examples 1 to 6 was carried out by the procedure as described below.

Alkali decreasing→rinsing with water→surface treatment→rinsing with water→rinsing with pure water → drying Surface treatment in Comparative Example 7 was carried out by the procedure as described below.

Alkali degreasing→rinsing with water→surface conditioning→zinc phosphate treatment→rinsing with water→rinsing with pure water→drying The alkali degreasing was conducted by diluting degreasing agent 1 (Fine Cleaner (registered trademark) L2032A manufactured by Nihon Parkerizing Co., Ltd.) to 2 wt %, and by diluting degreasing agent 2 (Fine Cleaner (registered trademark) L2032B manufactured by Nihon Parkerizing Co., Ltd.) to 1.4 wt % with tap water, and spraying the test plate with the degreasing agent at 40° C. for 120 seconds.

The rinsing with water and the rinsing with pure water were conducted by spraying the test plate with the water or the pure water at room temperature for 30 seconds.

In Examples 1 to 5 and Comparative Examples 1 to 6, the surface treatment was conducted by the procedure as described below depending on the surface treating solution used.

Example 1

Neodymium nitrate hexahydrate, a polyallylamine having a weight average molecular weight of 1000, and aluminum sulfate were added to an aqueous solution of hexafluorozirconic acid, and the mixture was then diluted with pure water to thereby adjust the weight concentration A of the zirconium (hereinafter simply referred to as "weight concentration A") to 500 ppm, the weight concentration B of the rare earth element (hereinafter simply referred to as "weight concentration B") to 250 ppm (so that the ratio K of the weight concentration B to the weight concentration A (i.e. K=B/A, which is hereinafter simply referred to as "ratio K") is 0.500), the weight concentration C of the polyallylamine (hereinafter simply referred to as "weight concentration C") to 30 ppm, and the weight concentration D of the aluminum ion (hereinafter simply referred to as "weight concentration D") to 150 ppm. Minute amounts of ammonium fluoride and sodium hydroxide were then added to obtain a surface treating solution having a weight concentration E of the free fluorine ion (as measured by a fluorine ion meter, model IM-55G manufactured by TOA Denpa Kogyo K.K.) of 8 ppm and a pH of 3.6. The weight concentration E of the free fluorine ion is hereinafter simply referred to as "weight concentration E".

The surface treatment was conducted by immersing the test plate for 120 seconds in the surface treating solution which had been heated to 40° C.

Example 2

Samarium nitrate hexahydrate, a polyallylamine having a weight average molecular weight of 2000, and aluminum hydroxide were added to an aqueous solution of zirconium nitrate, and the mixture was then diluted with pure water to thereby adjust the weight concentration A to 75 ppm, the weight concentration B to 375 ppm (so that the ratio K was 5.0), the weight concentration C to 70 ppm, and the weight concentration D to 100 ppm. Minute amounts of hydrofluoric acid and lithium hydroxide were then added to obtain a surface treating solution having a weight concentration E of 10 ppm and a pH of 3.8.

The surface treatment was conducted by immersing the test plate for 120 seconds in the surface treating solution which had been heated to 35° C.

Example 3

Praseodymium nitrate hexahydrate, a polyallylamine having a weight average molecular weight of 4000, and aluminum oxalate were added to an aqueous solution of zirconium nitrate, and the mixture was diluted with pure water to thereby adjust the weight concentration A to 10 ppm, the weight concentration B to 280 ppm (so that the ratio K was 28), the weight concentration C to 60 ppm, and the weight concentration D to 50 ppm. Minute amounts of ammonium fluoride and lithium hydroxide were then added to obtain a surface treating solution having a weight concentration E of 28 ppm and a pH of 4.4.

The surface treatment was conducted by immersing the test plate for 90 seconds in the surface treating solution which had been heated to 45° C.

Example 4

Cerium nitrate hexahydrate, a polyallylamine having a weight average molecular weight of 6000, and aluminum nitrate were added to an aqueous solution of hexafluorozirconic acid, and the mixture was then diluted with pure water to thereby adjust the weight concentration A to 150 ppm, the weight concentration B to 300 ppm (so that the ratio K was 2.00), the weight concentration C to 20 ppm, and the weight concentration D to 50 ppm. Minute amounts of hydrofluoric acid and ammonia were then added to obtain a surface treating solution having a weight concentration E of 6 ppm and a pH of 3.6.

The surface treatment was conducted by immersing the test plate for 90 seconds in the surface treating solution which had been heated to 50° C.

Example 5

Gadolinium nitrate hexahydrate, a polyallylamine having a weight average molecular weight of 3000, and aluminum sulfate were added to an aqueous solution of zirconium nitrate, and the mixture was then diluted with pure water to thereby adjust the weight concentration A to 950 ppm, the weight concentration B to 95 ppm (so that the ratio K was 0.10), the weight concentration C to 20 ppm, and the weight concentration D to 250 ppm. Minute amounts of hydrofluoric acid and sodium hydroxide were then added to obtain a surface treating solution having a weight concentration E of 0.8 ppm and a pH of 2.6.

The surface treatment was conducted by spraying the test plate for 60 seconds with the surface treating solution which had been heated to 40° C.

Comparative Example 1

Holmium nitrate pentahydrate and a polyallylamine having a weight average molecular weight of 2000 were added to an aqueous solution of zirconium nitrate, and the mixture was then diluted with pure water to thereby adjust the weight concentration A to 100 ppm, the weight concentration B to 0.5 ppm (so that the ratio K was 0.005), and the weight concentration C to 50 ppm. Minute amounts of ammonium fluoride and sodium hydroxide were added to obtain a surface treating solution having a weight concentration E of 60 ppm and a pH of 3.2.

The surface treatment was conducted by immersing the test plate for 120 seconds in the surface treating solution which had been heated to 40° C.

Comparative Example 2

Praseodymium nitrate hexahydrate, a polyallylamine having a weight average molecular weight of 4000, and aluminum oxalate were added to an aqueous solution of zirconium nitrate, and the mixture was diluted with pure water to thereby adjust the weight concentration A to 10 ppm, the weight concentration B to 0.05 ppm (so that the ratio K was 0.005), the weight concentration C to 60 ppm, and the weight concentration D to 50 ppm. Minute amounts of ammonium fluoride and lithium hydroxide were then added to obtain a surface treating solution having a weight concentration E of 30 ppm and a pH of 4.4.

The surface treatment was conducted by immersing the test plate for 90 seconds in the surface treating solution which had been heated to 45° C.

Comparative Example 3

Europium oxide hexahydrate, a polyallylamine having a weight average molecular weight of 3000, and aluminum nitrate were added to an aqueous solution of hexafluorozirconic acid, and the mixture was diluted with pure water to thereby adjust the weight concentration A to 2 ppm, the weight concentration B to 100 ppm (so that the ratio K was 50), the weight concentration C to 40 ppm, and the weight concentration D to 60 ppm. Minute amounts of ammonium fluoride and potassium hydroxide were then added to obtain a surface treating solution having a weight concentration E of 20 ppm and a pH of 3.0.

The surface treatment was conducted by immersing the test plate for 120 seconds in the surface treating solution which had been heated to 45° C.

Cerium sulfate hexahydrate and aluminum hydroxide were added to an aqueous solution of zirconium nitrate, and the mixture was diluted with pure water to thereby adjust the weight concentration A to 200 ppm, the weight concentration B to 200 ppm (so that the ratio K was 1,00), and the weight concentration D to 200 ppm. Minute amounts of hydrofluoric acid and ammonia were then added to obtain a surface treating solution having a weight concentration E of 10 ppm and a pH of 3.6.

The surface treatment was conducted by immersing the test plate for 90 seconds in the surface treating solution which had been heated to 50° C.

Comparative Example 5

Cerium nitrate hexahydrate and a polyallylamine having a weight average molecular weight of 6000 were added to an aqueous solution of hexafluorozirconic acid, and the mixture was diluted with pure water to thereby adjust the weight concentration A to 150 ppm, the weight concentration B to 300 ppm (so that the ratio K was 2.00), and the weight concentration C to 20 ppm. Minute amounts of hydrofluoric acid and ammonia were then added to obtain a surface treating solution having a weight concentration E of 6 ppm and a pH of 3.6.

The surface treatment was conducted by immersing the test plate for 90 seconds in the surface treating solution which had been heated to 50° C.

Comparative Example 6

Cerium sulfate hexahydrate, a polyallylamine having a weight average molecular weight of 6000, and aluminum nitrate were added to an aqueous solution of zirconium nitrate, and the mixture was diluted with pure water to thereby adjust the weight concentration A to 150 ppm, the weight concentration B to 300 ppm (so that the ratio K was 2.00), the weight concentration C to 20 ppm, and the weight concentration D to 1000 ppm. Minute amounts of hydrofluoric acid and ammonia were then added to obtain a surface treating solution having a weight concentration E of 6 ppm and a pH of 3.6.

The surface treatment was conducted by spraying the test plate for 90 seconds with the surface treating solution which had been heated to 50° C.

In Comparative Example 7, surface conditioning and zinc phosphate treatment were conducted by the procedures as described below.

Comparative Example 7

The surface was adjusted by spraying the surface of the test plate with a surface conditioning agent (Preparen (registered trademark) ZN manufactured by Nihon Parkerizing Co., Ltd.) which had been diluted with tap water to a concentration of 0.1 wt % at room temperature for 30 seconds.

Zinc phosphate treatment was conducted by diluting a zinc phosphate surface treating agent (Palbond (registered trademark) L3020 manufactured by Nihon Parkerizing Co., Ltd.) with tap water to 4.8 wt %, adding a sodium hydrogenfluoride reagent to a fluorine weight concentration of 200 ppm, and immersing the test plate in the zinc phosphate chemical conversion solution at 43° C. whose total acidity and free acidity had been adjusted to the center value on the catalog to deposit the zinc phosphate coating.

2. Evaluation of the Coating Formed by the Surface Treatment and Measurement of the Coating Weight The coated iron material produced was evaluated for the outer appearance of the coating by visual inspection.

In Examples 1 to 5 and Comparative Examples 1 to 6, the zirconium coating weight of the coating was measured by an X-ray fluorescence analyzer (System 3270 manufactured by Rigaku Denki Corp.). In Comparative Example 7, the zinc phosphate coating weight was measured by an X-ray fluorescence analyzer (System 3270 manufactured by Rigaku Denki Corp.).

3. Evaluation of the Paintability

The test plate was coated by the procedure as described below to produce an electrodeposited plate for use in evaluating the paintability of the coated iron material.

Cationic electrodeposition→rinsing with pure water → baking

Cationic electrodeposition was conducted at a voltage of 200 V by using an epoxy coating composition for cationic electrodeposition (manufactured by Kansai Faint Co., Ltd.) to obtain a coating thickness of 20 μm.

Baking was conducted at 175° C. for 20 minutes.

Paintability was evaluated as described below by using an electrodeposited plate. The coating after completing the cationic electrodeposition is referred to as the "electrodeposited coating".

(1) SDT1: Single Side Maximum Peeling Width in Warm Salt Water Test (Electrodeposited Coating)

The electrodeposited plate having cross-cuts formed with a sharp knife was immersed in 5 wt % aqueous solution of NaCl at 50° C. for 240 hours. The plate was then rinsed with tap water, and dried at room temperature.

Next, a peeling test was conducted by attaching an adhesive tape to the cross-cut portion of the electrodeposited coating and peeling the tape off the surface, and the single side maximum peeling width at the cross-cut portion was measured. The single side maximum peeling width was evaluated according to the following criteria.

A: single side maximum peeling width of less than 1.0 mm

B: single side maximum peeling width of at least 1.0 mm and less than 2.5 mm

C: single side maximum peeling width of at least 2.5 mm and less than 3.0 mm

D: single side maximum peeling width of at least 3.0 mm (2) SDT2: Total Blister Area of Ordinary Surface in Warm Salt Water Test (Electrodeposited Coating)

The electrodeposited plate was immersed in a 5 wt % aqueous solution of NaCl at 50° C. for 240 hours. The plate was then rinsed with tap water, and dried at room temperature.

Next, the total area of the blisters generated on the ordinary surface of the electrodeposited coating was measured, and the total blister area was evaluated according to the following criteria.
- A: total blister area of 0%
- B: total blister area of more than 0% and less than 0.5%
- C: total blister area of at least 0.5% and less than 1.0%
- D: total blister area of at least 1.0%

(3) CCT (Combined Cycle Test) (Electrodeposited Coating)

The electrodeposited plate having cross-cuts formed with a sharp knife was placed in a combined cycle tester, and the process including "wetting (40° C., 95% RH, 2 hours) →salt spraying (5 wt % aqueous solution of NaCl, 35° C., 2 hours)→ drying (60° C., 1 hour)→wetting (50° C., 95% RH, 6 hours)→drying (60° C., 2 hours)→low temperature (−20° C., 3 hours)" was repeated for 50 cycles. The cross-cuts after the 50 cycles were measured for the single side maximum blister width, and the single side maximum blister width was determined according to the following criteria.
- A: single side maximum blister width of less than 3.0 mm
- B: single side maximum blister width of at least 3.0 mm and less than 3.5 mm
- C: single side maximum blister width of at least 3.5 mm and less than 4.0 mm
- D: single side maximum blister width of at least 4.0 mm The results of determining the outer appearance and the coating weight of the coating formed by the surface treatment are shown in Tables 1 and 2.

In Examples 1 to 5, a uniform coating could be formed on both of the SPC and the high tensile steel strip, and the coating formed had the intended coating weight.

In contrast, when the ratio K was too small and the weight concentration E was too high (Comparative Example 1), or when the ratio K was too small (Comparative Example 2), sufficient amount of coating could not be deposited on both the SPC and the high tensile steel strip presumably because the precipitation of the component (a) was insufficiently promoted by the component (b).

When the ratio K was too large and the weight concentration A was too low (Comparative Example 3), sufficient amount of coating could not be deposited on both the SPC and the high tensile steel strip.

Table 3 shows the results of the SDT1 test (single side maximum peeling width).

In Examples 1 to 5, the corrosion resistance was very high for both the SPC and the high tensile steel strip, and the corrosion resistance was even superior to the case where the zinc phosphate treatment commonly used for the undercoat prior to the cationic electrodeposition was carried out (Comparative Example 7).

In contrast, when the coating amount was insufficient (Comparative Example 1 to 3), the corrosion resistance was inferior.

In the absence of the component (c) (Comparative Example 4), or in the absence of the component (d) (Comparative Example 5), the corrosion resistance was somewhat inferior.

Table 4 shows the results of the SDT2 test (total blister area).

In Examples 1 to 5, corrosion resistance was extremely high for both the SPC and the high tensile steel strip, and the corrosion resistance was comparable to the case where the zinc phosphate treatment was carried out (Comparative Example 7).

In contrast, the corrosion resistance was inferior when the coating amount was insufficient (Comparative Examples 1 to 3), when the component (c) was not used (Comparative Example 4), and when the weight concentration D was excessively high (Comparative Example 6).

In the absence of the component (d) (Comparative Example 5), the coating exhibited high corrosion resistance. The corrosion resistance, however, was inferior to that in Examples 1 to 5.

Table 5 shows the results of the CCT test (single side maximum blister width).

In Examples 1 to 5, the corrosion resistance was very high for both the SPC and the high tensile steel strip, and the corrosion resistance was even higher than the case where the zinc phosphate treatment was carried out (Comparative Example 7).

In contrast, in the case of insufficient coating amount (Comparative Examples 1 to 3), and in the absence of the component (d) (Comparative Example 5), the corrosion resistance was poor.

In the absence of the component (c) (Comparative Example 4), the corrosion resistance was somewhat inferior.

As demonstrated by the results as described above, the present invention is capable of forming a coating having an excellent corrosion resistance by the surface treatment.

TABLE 1

| | Outer appearance of the coating formed by the surface treatment | |
|---|---|---|
| | SPC | High tensile steel strip |
| Example 1 | Consistent interference color | Consistent interference color |
| Example 2 | Consistent interference color | Consistent interference color |
| Example 3 | Consistent interference color | Consistent interference color |
| Example 4 | Consistent interference color | Consistent interference color |
| Example 5 | Consistent interference color | Consistent interference color |
| Comparative Example 1 | Inconsistent interference color | Inconsistent interference color |
| Comparative Example 2 | Inconsistent interference color | Inconsistent interference color |
| Comparative Example 3 | Inconsistent interference color | Inconsistent interference color |
| Comparative Example 4 | Consistent interference color | Consistent interference color |
| Comparative Example 5 | Consistent interference color | Consistent interference color |
| Comparative Example 6 | Consistent interference color | Consistent interference color |
| Comparative Example 7 | Consistent gray color | Consistent gray color |

TABLE 2

| | Zirconium coating weight (mg/m$^2$) | |
|---|---|---|
| | SPC | High tensile steel strip |
| Example 1 | 80 | 100 |
| Example 2 | 60 | 85 |

TABLE 2-continued

|  | Zirconium coating weight (mg/m$^2$) | |
|---|---|---|
|  | SPC | High tensile steel strip |
| Example 3 | 20 | 30 |
| Example 4 | 50 | 75 |
| Example 5 | 60 | 70 |
| Comparative Example 1 | 6 | 7 |
| Comparative Example 2 | 6 | 6 |
| Comparative Example 3 | 4 | 5 |
| Comparative Example 4 | 80 | 110 |
| Comparative Example 5 | 55 | 70 |
| Comparative Example 6 | 40 | 55 |
| Comparative Example 7 | *2.3 (g/m$^2$) | *2.4 (g/m$^2$) |

*Zinc phosphate coating weight

TABLE 3

|  | Results of the SDT 1 test (Single side maximum peeling width) | |
|---|---|---|
|  | SPC | High tensile steel strip |
| Example 1 | A | A |
| Example 2 | A | A |
| Example 3 | A | A |
| Example 4 | A | A |
| Example 5 | A | A |
| Comparative Example 1 | D | D |
| Comparative Example 2 | D | D |
| Comparative Example 3 | D | D |
| Comparative Example 4 | C | C |
| Comparative Example 5 | C | C |
| Comparative Example 6 | D | D |
| Comparative Example 7 | B | B |

TABLE 4

|  | Results of the SDT 2 test (Total blister area) | |
|---|---|---|
|  | SPC | High tensile steel strip |
| Example 1 | A | A |
| Example 2 | A | A |
| Example 3 | A | A |
| Example 4 | A | A |
| Example 5 | A | A |
| Comparative Example 1 | D | D |
| Comparative Example 2 | D | D |
| Comparative Example 3 | D | D |
| Comparative Example 4 | D | D |
| Comparative Example 5 | B | B |
| Comparative Example 6 | D | D |
| Comparative Example 7 | A | A |

TABLE 5

|  | Results of the CCT test (Single side maximum blister width) | |
|---|---|---|
|  | SPC | High tensile steel strip |
| Example 1 | A | A |
| Example 2 | A | A |
| Example 3 | A | A |
| Example 4 | A | A |
| Example 5 | A | A |
| Comparative Example 1 | D | D |
| Comparative Example 2 | D | D |
| Comparative Example 3 | D | D |
| Comparative Example 4 | C | C |
| Comparative Example 5 | D | D |
| Comparative Example 6 | A | A |
| Comparative Example 7 | B | B |

What is claimed is:

1. A solution for treating a surface of an iron material comprising components (a), (b), (c), (d), and (e):
    (a) zirconium fluoride;
    (b) ion of a rare earth element and/or a compound containing a rare earth element;
    (c) a polyallylamine;
    (d) aluminum ion; and
    (e) free fluorine ion, wherein
    zirconium in the component (a) is included at a weight concentration A of 10 to 1000 ppm,
    a ratio K of a weight concentration B of the rare earth element in the component (b) to the weight concentration A (K=B/A) is 0.1 to 30,
    the component (d) is included at a weight concentration D of 50 to 250 ppm, and
    the component (e) is included at a weight concentration E of 0.5 to 30 ppm.

2. The solution for treating the surface of the iron material according to claim 1 wherein the solution has a pH of 2.0 to 5.0.

3. A method for treating a surface of an iron material comprising the step of:
    contacting the iron material with the solution for treating the surface of the iron material of claim 1.

4. A coated iron material comprising:
    an iron material; and
    a coating formed on a surface of the iron material by the method for treating the surface of the iron material of claim 3, the coating containing zirconium and having a zirconium coating weight of at least 20 mg/m$^2$.

* * * * *